US010630787B2

(12) United States Patent
Saito

(10) Patent No.: US 10,630,787 B2
(45) Date of Patent: Apr. 21, 2020

(54) MEDIATION SERVER MEDIATING COMMUNICATION BETWEEN SERVICE PROVIDER SERVER AND FIRST AND SECOND COMMUNICATION APPARATUSES

(71) Applicant: Brother Kogyo Kabushiki Kaisha, Nagoya-shi, Aichi-ken (JP)

(72) Inventor: Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 266 days.

(21) Appl. No.: 15/472,994

(22) Filed: Mar. 29, 2017

(65) Prior Publication Data

US 2017/0289275 A1    Oct. 5, 2017

(30) Foreign Application Priority Data

Mar. 31, 2016  (JP) ................. 2016-071302

(51) Int. Cl.
*G06F 15/16* (2006.01)
*H04L 29/08* (2006.01)
(Continued)

(52) U.S. Cl.
CPC .......... *H04L 67/16* (2013.01); *H04L 41/0806* (2013.01); *H04L 63/0807* (2013.01);
(Continued)

(58) Field of Classification Search
CPC .... H04L 67/16; H04L 41/0806; H04W 12/06; H04W 12/08
See application file for complete search history.

(56) References Cited

U.S. PATENT DOCUMENTS 8,627,438 B1 *   1/2014   Bhimanaik ............. H04L 63/10
                                                           726/9
9,053,310 B2 *   6/2015   Oberheide .............. G06F 21/32
(Continued)

FOREIGN PATENT DOCUMENTS

JP   2013-118558 A   6/2013
JP   2014-134886 A   7/2014
JP   2015-007914 A   1/2015

*Primary Examiner* — Douglas B Blair
(74) *Attorney, Agent, or Firm* — Banner & Witcoff, Ltd.

(57) ABSTRACT

In a mediation server, a processor registers association information and the authentication information for receiving a service from a service provider server to be correlated with each other. The association information is concerned with first and second communication apparatuses. When a first request including the association information is received from the first communication apparatus, the processor performs first communication with the first communication apparatus and the service provider server by using the first authentication information. The first communication is for the first communication apparatus to receive the service from the service provider server. When a second request including the association information is received from the second communication apparatus, the processor performs second communication with the second communication apparatus and the service provider server by using the first authentication information. The second communication is for the second communication apparatus to receive the service from the service provider server.

18 Claims, 11 Drawing Sheets

(51) Int. Cl.
*H04L 29/06* (2006.01)
*H04N 1/00* (2006.01)
*H04N 1/44* (2006.01)
*H04L 12/24* (2006.01)
*H04W 12/06* (2009.01)
*H04W 12/08* (2009.01)
*G06F 3/12* (2006.01)

(52) U.S. Cl.
CPC ......... *H04L 67/42* (2013.01); *H04N 1/00206* (2013.01); *H04N 1/00244* (2013.01); *H04N 1/00973* (2013.01); *H04N 1/4426* (2013.01); *H04W 12/06* (2013.01); *H04W 12/08* (2013.01); *G06F 3/1203* (2013.01); *G06F 3/1271* (2013.01); *G06F 3/1287* (2013.01)

(56) References Cited

U.S. PATENT DOCUMENTS

| | | | | |
|---|---|---|---|---|
| 9,065,824 | B1* | 6/2015 | Valdivia | H04L 63/0884 |
| 9,232,083 | B2 | 1/2016 | Miyazawa et al. | |
| 9,367,275 | B2 | 6/2016 | Shiratori | |
| 9,443,073 | B2* | 9/2016 | Oberheide | G06F 21/44 |
| 9,608,814 | B2* | 3/2017 | Oberheide | H04L 9/083 |
| 9,996,825 | B1* | 6/2018 | Casey | G06Q 20/102 |
| 10,142,309 | B2* | 11/2018 | Kaplan | H04L 51/046 |
| 10,223,549 | B2* | 3/2019 | Banerjee | H04L 63/083 |
| 10,257,205 | B2* | 4/2019 | Mathew | H04L 63/105 |
| 2003/0177171 | A1* | 9/2003 | Brown, Jr. | G06Q 10/107 |
| | | | | 709/203 |
| 2003/0196084 | A1* | 10/2003 | Okereke | H04L 63/0281 |
| | | | | 713/156 |
| 2004/0260646 | A1* | 12/2004 | Berardi | G06Q 20/00 |
| | | | | 705/39 |
| 2006/0178937 | A1* | 8/2006 | Rau | G06F 21/00 |
| | | | | 705/18 |
| 2010/0288834 | A1* | 11/2010 | Tichelaer | G06Q 20/04 |
| | | | | 235/380 |
| 2013/0141743 | A1* | 6/2013 | Miyazawa | H04N 1/4426 |
| | | | | 358/1.13 |
| 2014/0074569 | A1* | 3/2014 | Francis | G06Q 20/40 |
| | | | | 705/14.3 |
| 2014/0282821 | A1* | 9/2014 | Adler | G06F 21/44 |
| | | | | 726/1 |
| 2014/0376039 | A1* | 12/2014 | Shiratori | G06F 3/1287 |
| | | | | 358/1.15 |
| 2015/0242837 | A1* | 8/2015 | Yarbrough | G06Q 20/327 |
| | | | | 705/44 |
| 2016/0011830 | A1* | 1/2016 | Asakura | H04W 76/10 |
| | | | | 358/1.15 |
| 2016/0050130 | A1* | 2/2016 | Ljung | H04L 43/0811 |
| | | | | 709/224 |
| 2016/0080601 | A1 | 3/2016 | Miyazawa et al. | |
| 2016/0285633 | A1* | 9/2016 | Allinson | G06F 21/34 |
| 2016/0321628 | A1* | 11/2016 | Xu | H04L 67/306 |
| 2017/0025124 | A1* | 1/2017 | Mixter | G10L 15/32 |

* cited by examiner

FIG. 2

USER TABLE 38

| SERVICE NAME | DISPLAY NAME | ACCESS TOKEN | |
|---|---|---|---|
| SV1 | Bob | AT1 | ← 38a |
| SV2 | Tom | – | ← 38b |

USER TABLE 78

| SERVICE NAME | DISPLAY NAME | ACCESS TOKEN | |
|---|---|---|---|
| SV3 | Alice | AT2 | ← 78a |
| SV1 | Bob | AT3 | ← 78b |

TOKEN TABLE 118

| MAC ADDRESS | SERVICE NAME | DISPLAY NAME | REFRESH TOKEN | |
|---|---|---|---|---|
| MAC1 | SV2 | Tom | RT1 | ← 118a |

GROUP TABLE 120 (FIRST AND SECOND EMBODIMENTS)

| GROUP ID | SERVICE NAME | DISPLAY NAME | AT(RT) | |
|---|---|---|---|---|
| AAA | SV1 | Bob | AT1 | ← 120a |
| | SV2 | Tom | RT1 | ← 120b |
| | SV3 | Alice | AT2 | ← 120c |
| | SV1 | Bob.Jr | AT3 | ← 120d |
| | SV1 | Tanaka | AT4 | ← 120e |

DEVICE TABLE 122 (FIRST EMBODIMENT)

| GROUP ID | MAC ADDRESS | |
|---|---|---|
| AAA | MAC1 | ← 122a |
| | MAC2 | ← 122b |

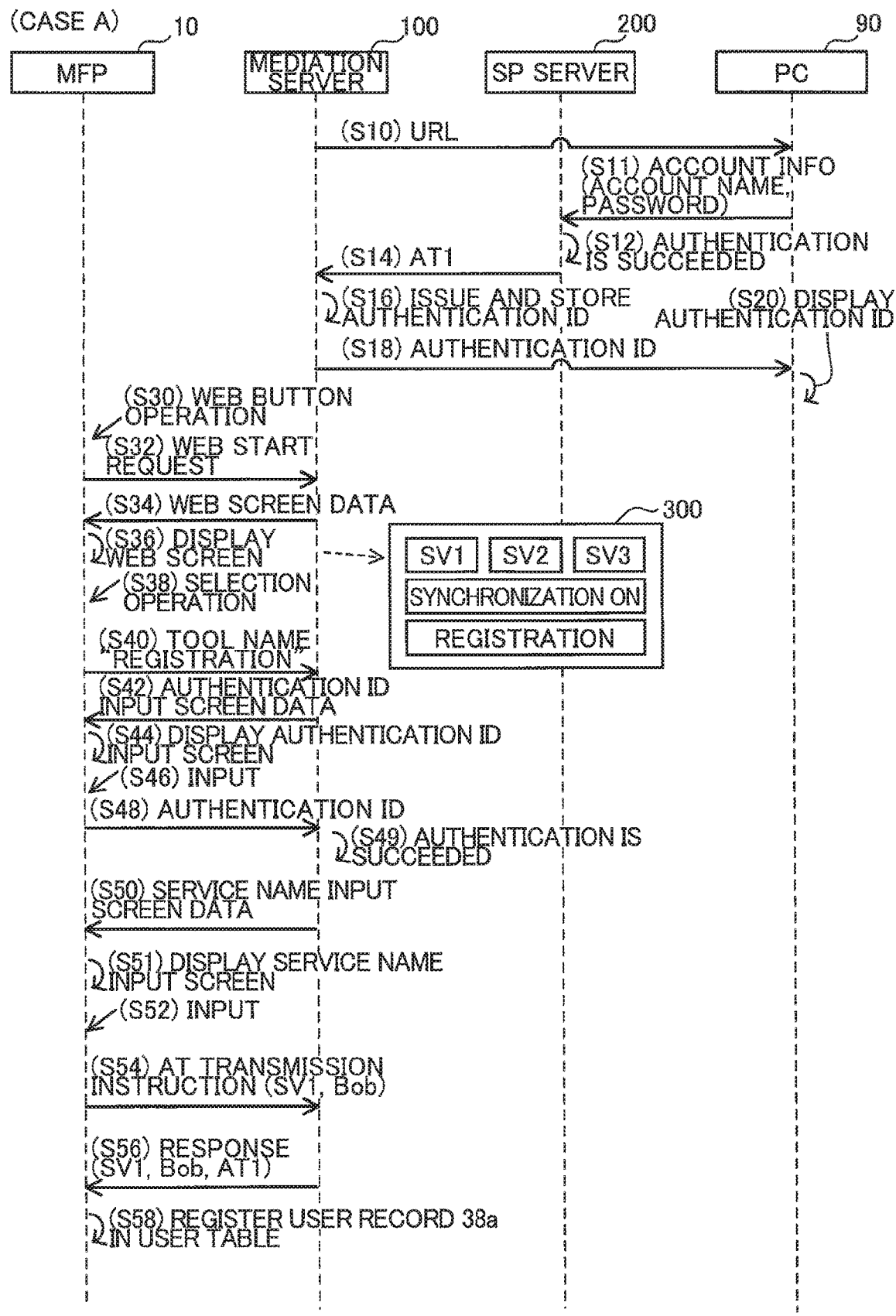

MEDIATION SERVER MEDIATING COMMUNICATION BETWEEN SERVICE PROVIDER SERVER AND FIRST AND SECOND COMMUNICATION APPARATUSES

CROSS REFERENCE TO RELATED APPLICATION

This application claims priority from Japanese Patent Application No. 2016-071302 filed Mar. 31, 2016. The entire content of the priority application is incorporated herein by reference.

TECHNICAL FIELD

The present disclosure relates to a mediation server for mediating a service from a service provider server to a communication apparatus.

BACKGROUND

In a conventional communication system, account information is registered in a service provider server for a user of a multifunction peripheral. In this system, the user performs authentication procedures by accessing a mediation server via a personal computer and inputting the account information to the service provider server via the mediation server. When the authentication is successful, the service provider server generates an access token corresponding to the account information and transmits the access token to the multifunction peripheral via the mediation server. The multifunction peripheral transmits the access token to the mediation server for accessing a folder which corresponds to the account information and is stored in the service provider apparatus. The mediation server allows the service provider server to perform authentication using the access token. When this authentication is succeeded, the service provider server transmits data in the folder to the multifunction peripheral.

SUMMARY

A user may wish that an access token stored in a first multifunction peripheral is used by a second multifunction peripheral. For example, the user may wish that the second multifunction peripheral downloads data in a folder of the service provider server. However, no conventional technique considers such a situation.

In view of the foregoing, it is an object of the invention to provide a technique enabling a plurality of communication apparatuses to receive a service from a service provider server by sharing authentication information.

In order to attain the above and other objects, the disclosure provides a mediation server. The mediation server includes a communication interface, a processor, and a memory. The communication interface is communicable with a first service provider server, a first communication apparatus, and a second communication apparatus different from the first communication apparatus. The memory stores computer-readable instructions therein. The computer-readable instructions, when executed by the processor, causes the mediation server to perform: acquiring first authentication information for receiving a first service from the first service provider server; registering association information and the first authentication information in the memory so as to be correlated with each other, the association information being concerned with the first communication apparatus and the second communication apparatus; in a case where a first request including the association information is received from the first communication apparatus, performing first communication with the first communication apparatus and the first service provider server by using the first authentication information correlated with the association information in the memory, the first communication being for the first communication apparatus to receive the first service from the first service provider server; and in a case where a second request including the association information is received from the second communication apparatus, performing second communication with the second communication apparatus and the first service provider server by using the first authentication information correlated with the association information in the memory, the second communication being for the second communication apparatus to receive the first service from the first service provider server.

According to other aspects, the disclosure provides a mediation server. The mediation server includes a communication interface, and a memory. The communication interface is communicable with a first service provider server, a first communication apparatus, and a second communication apparatus different from the first communication apparatus. The mediation server further includes: acquiring means for acquiring first authentication information for receiving a first service from the first service provider server; registering means for registering association information and the first authentication information in the memory so as to be correlated with each other, the association information being concerned with the first communication apparatus and the second communication apparatus; first performing means, in a case where a first request including the association information is received from the first communication apparatus, for performing first communication with the first communication apparatus and the first service provider server by using the first authentication information correlated with the association information in the memory, the first communication being for the first communication apparatus to receive the first service from the first service provider server; and second performing means, in a case where a second request including the association information is received from the second communication apparatus, for performing second communication with the second communication apparatus and the first service provider server by using the first authentication information correlated with the association information in the memory, the second communication being for the second communication apparatus to receive the first service from the first service provider server.

BRIEF DESCRIPTION OF THE DRAWINGS

The particular features and advantages of the disclosure as well as other objects will become apparent from the following description taken in connection with the accompanying drawings, in which:

FIG. 2 is examples of tables according to the embodiment;

FIG. 3 is a sequence chart of Case A regarding registration of user record;

DETAILED DESCRIPTION

First Embodiment (Configuration of System)

Figure 1:
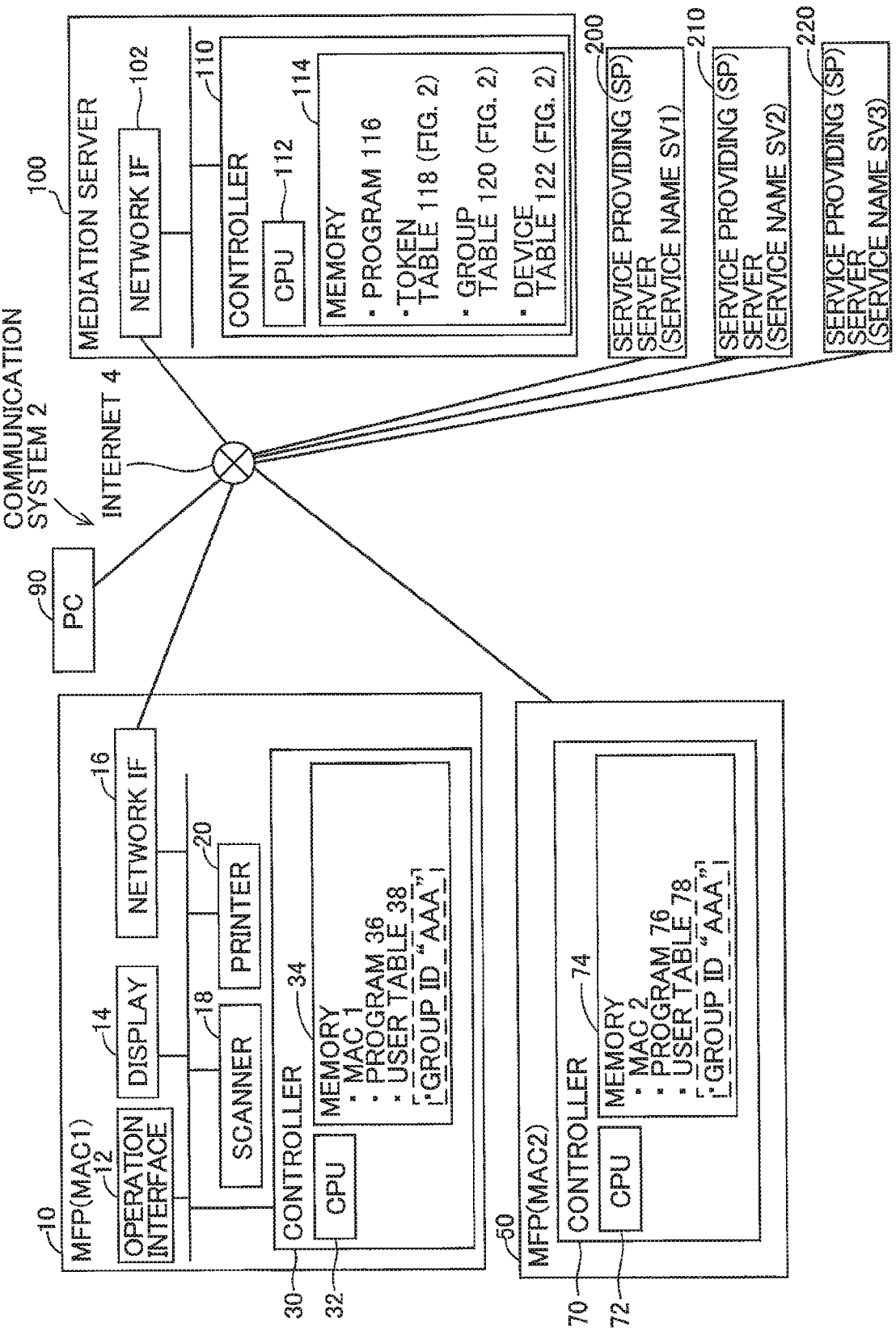
FIG. 1 is a block diagram illustrating configuration of a communication system according to an embodiment.

As shown in FIG. 1, a communication system 2 includes MFPs (multifunction peripherals) 10 and 50, a PC (Personal Computer) 90, and a mediation server 100. The MFPs 10 and 50, the PC 90, and the mediation server 100 can communicate with each other via Internet 4. SP (service provider) servers 200, 210, and 220 are connected to the Internet 4. The MFPs 10 and 50, the PC 90, and the mediation server 100 can communicate with each of the SP servers 200, 210, and 220.

(Structure of MFP 10)

The MFP 10 is a peripheral equipment of the PC 90 and capable of executing various functions including printing function and scanning function. The MFP 10 includes an operation interface 12, a display 14, a network interface (IF) 16, a scanner 18, a printer 20, and a controller 30.

The operation interface 12 includes a plurality of keys. The user inputs various instructions into the MFP 10 by operating the operation interface 12. The display 14 is for displaying various information. The display 14 is a touch panel and thus has a function as an operation interface. In the following descriptions, "the operation interface 12" indicates the operation interface 12 itself and/or the combination of the operation interface 12 and the touch panel of the display 14. The network IF 16 is connected to the Internet 4 via a LAN (Local Area Network) (not shown). The scanner 18 is a scanning mechanism including CCD or CIS. The printer 20 is a printing mechanism in an inkjet method or a laser method.

The controller 30 includes a CPU 32 and a memory 34. The memory 34 stores a program 36, a user table 38 (FIG. 2), and a MAC address MAC1 assigned to the MFP 10. The CPU 32 performs various processes according to the program 36.

(Structure of MFP 50)

The MFP 50 has the same structure as the MFP 10. Specifically, the MFP 50 includes a controller 70 having a CPU 72 and a memory 74. The memory 74 stores a program 76, a user table 78 (FIG. 2), and a MAC address MAC2 assigned to the MFP 50.

(Structure of Mediation Server 100)

The mediation server 100 is located on the Internet 4 by a vender of the MFPs 10 and 50. The mediation server 100 mediates provision (or supply) of the service from each of the SP severs 200, 210, and 220 to each of the MFPs 10 and 50. The mediation server 100 includes a network interface (IF) 102 and a controller 110. The network IF 102 is connected to the Internet 4.

The controller 110 includes a CPU 112 and a memory 114. The memory 114 stores a program 116, a token table 118, a group table 120, and a device table 122 (see FIG. 2). The CPU 112 performs various processes according to the program 116.

(Structure of Service Provider Servers 200, 210, and 220)

Each of the SP servers 200, 210, and 220 is a third party server of services, such as, "Evernote (registration trademark)", "Google ((registration trademark)) Docs", "PICASA (registration trademark)", and "FACEBOOK (registration trademark)". Each of the SP servers 200, 210, and 220 can provide services to various communication apparatuses such as the MFPs 10 and 50. In the embodiment, service names of the SP servers 200, 210, and 220 are respectively "SV1", "SV2", and "SV3".

The SP server 200 can provide a first service to store image file(s) acquired from a communication apparatus. The SP server 100 can further provide a second service to provide the communication apparatus with the stored image file(s). For the communication apparatus (or for user), the first service is an upload service for uploading the image file(s) to the SP server 200, and the second service is a download service for downloading the image file(s) from the SP server 200. For example, the MFP 10 can perform a download (DL) print in which the image file is downloaded from the SP server 200 and an image represented by the downloaded image file is printed. Further, the MFP 10 can perform a scan upload (UL) in which a scan image file generated by scanning an image is uploaded to the server 200. The SP servers 210 and 220 can perform services the same as those of the SP server 200.

In the embodiment, a same authentication method is executed by the SP servers 200 and 220, but the authentication method executed by the SP servers 200 and 220 is different from an authentication method executed by the SP server 210. Specifically, each of the SP servers 200 and 220 performs authentication by using an access token received from the communication apparatus, and provides services to the communication apparatus when the authentication is succeeded. The access token is authentication information for using the SP servers 200 and 220. In the following, the access token is referred to as "AT". When the SP server 210 successfully authenticates a refresh token received from a communication apparatus, the SP server 210 transmits an AT together with a new refresh token. Subsequently, the SP server 210 performs authentication by using the AT received from the communication apparatus, and provides services to the communication apparatus when the authentication is succeeded. The refresh token is authentication information for issuing the AT which is needed to use service of the SP server 210. In the following, the refresh token is referred to as "RT". An SP server (210), which performs authentication by using both the RT and the AT, is referred to as a refresh server.

(Contents of User Tables 38 and 78, FIG. 2)

As shown in FIG. 2, the user table 38 stored in the MFP 10 registers user records (or user information) 38a and 38b. Each of the user records 38a and 38b correlates a service name, a display name, and an AT, and is information for a user to receive a service from the SP server by using the MFP 10. Each display name is a name of a user displayed on the MFP 10. The service names and the ATs are explained above. The record 38a is information for a user corresponding to the display name "Bob" to receive a service from the SP server 200. The record 38b is information for a user corresponding to the display name "Tom" to receive a service from the SP server 210. Because the SP server 210 is the refresh server, the record 38b does not include an access token. Similarly to the user table 38, the user table 78 of the MFP 50 registers user records 78*a* and 78*b* which are for users to receive services from the SP servers by using the MFP 50.

(Contents of Token Table 118, FIG. 2)

The token table 118 stored in the mediation server 100 registers a token record (or token information) 118*a* which correlates a MAC address, a service name, a display name, and an RT. The mediation server 100 can acquire an AT by using the RT in the record 118*a*, and can transmit the AT to the MFP 10.

(Contents of Group Table 120, FIG. 2)

The group table 120 stored in the mediation server 100 registers a group ID "AAA" and user records (or user information) 120*a*-120*e* correlated with the group ID "AAA". The group ID "AAA" is identification information for identifying a group with which the MFPs 10 and 50 participate. Each of the user records 120*a*-120*e* correlates a group name, a display name, and an AT or RT.

(Contents of Device Table 122, FIG. 2)

The device table 122 stored in the mediation server 100 registers device records (or device information) 122*a* and 122*b*. Each of the device records 122*a* and 122*b* correlates the group ID "AAA" and an MAC address. Each MAC address indicates an MAC address ("MAC1", for example) of one of the MFPs 10 and 50 which participates the group identified by the group ID "AAA".

In the embodiment, when the group ID and the user records 120*a*-120*e* are recorded in the group table 120 and when the device records 122*a* and 122*b* are recorded in the device table 122, each of the MFPs 10 and 50 can receive a service from the SP server by using a user record registered in its own user table, and further receive the service from the SP server by using a user record registered in a user table stored in other machine.

(Case A Regarding Registration of User Record, FIG. 3)

A process of Case A will be explained while referring to FIG. 3. In Case A, the user of the MFP 10 corresponding to the display name "Bob" registers in the user table 38 a user record ("SV1", "Bob", and "AT1") for receiving a service from the SP server 200.

The user registers account information including an account name and a password in the SP server 200 in advance by using the PC 90. Thereafter, in response to access from the PC 90, in S10 the CPU 112 of the mediation server 100 transmits to the PC 90 via the network IF 102 an URL (Uniform Resource Locator) for accessing to the SP server 200. Because each communication by the mediation server 100 is always performed by the network IF 102, the expressions "via the network IF 52" will be abbreviated in the following explanations regarding communication by the mediation server 100.

In S11 the user accesses to the SP server 200 by using the URL from the PC 90, and performs authentication procedures by inputting the account information including an account name and a password in the SP server 200. If the authentication is succeeded in S12, in S14 the SP server 200 generates an AT1 which is an access token corresponding to the account information, and transmits the AT1 to the mediation server 100.

In S14 the CPU 112 receives the AT1 from the SP server 200. In S16 the CPU 112 issues authentication ID corresponding to the AT1, and temporarily stores the authentication ID and the AT1 correlated with each other in the memory 114. In S18 the CPU 112 transmits the authentication ID to the PC 90. As a result, in S20 the PC 90 displays the authentication ID.

In S30 the user performs a prescribed Web button operation by using the operation interface 12 of the MFP 10 for transmitting a Web start request, then in S32 the CPU 112 receives the Web start request from the MFP 10. In S34 the CPU 112 transmits prescribed Web screen data to the MFP 10 so that in S36 the display 14 of the MFP 10 displays a prescribed Web screen 300 represented by the Web screen data. The Web screen 300 includes three service name selection buttons "SV1", "SV2", and "SV3", and two tool name selection buttons "synchronization ON" and "registration". In Case A, in S38 the user selects the tool name "registration" in the Web screen 300.

In S40 the CPU 112 receives the tool name "registration" from the MFP 10. In S42 the CPU 112 transmits prescribed authentication ID input screen data to the MFP 10 so that in S44 the display 14 displays a prescribed authentication ID input screen (not shown) represented by the authentication ID input screen data. The authentication ID input screen is a display for requiring that the user input of the authentication ID. In Case A, in S46 the user inputs the authentication ID which was displayed on the PC 90 in S20.

In S48 the CPU 112 receives the authentication ID from the MFP 10. In S49 the CPU 112 authenticates the authentication ID, and the authentication is succeeded. Then, in S50 the CPU 112 transmits to the MFP 10 prescribed service name input screen data so that in SM the display 14 displays a prescribed service name input screen (not shown) represented by the service name input screen data. The service name input screen is a screen for requiring that the user input the service name of the SP server and the display name. In Case A, in S52 the user inputs the service name "SV1" and the display name "Bob".

In S54 the CPU 112 receives from the MFP 10 an AT transmission instruction including the service name "SV1" and the display name "Bob". The AT transmission instruction is a command for requesting transmission of the "AT1". In Case A, in S56 the CPU 112 transmits to the MFP 10 a response including the service name "SV1" received in S54, the display name "Bob" received in S54, and the AT1 correlated to the authentication ID which was successfully authenticated in S49.

In S58 the MFP 10 registers in the user table 38 information "SV1", "Bob", and "AT1" included in the received response. That is, the recordation of the user record 38*a* (FIG. 2) is complete.

Though not shown in the drawings, similarly to the user record 38*a*, the user record 38*b* is recorded in the user table 38, and the user records 78*a* and 78*b* are recorded in the user table 78. However, the process for recording user record 38*b* in the user table 38 is different from that of the user record 38*a* in the following points. That is, in S14 the CPU 112 receives the refresh token RT1 from the SP server 210 instead of the AT1. In S54 the CPU 112 receives from the MFP 10 the service name "SV2", the display name "Tom", and the MAC address "MAC1" of the MFP 10. In this case, the CPU 112 registers "SV2", "Tom", "MAC1", and "RT1" correlated with each other in the token table 118. That is, registration of the token record 118*a* (FIG. 2) is complete. In S56 the CPU 112 transmits to the MFP 10 a response which includes the service name"SV2" and the display name "Tom" but does not include the refresh token "RT1". In S58 the MFP 10 registers information "SV2" and "Tom" correlated with each other in the user table 38 as the record 38*b* (FIG. 2). That is, registration of the record 38*b* is complete.

Figure 4:
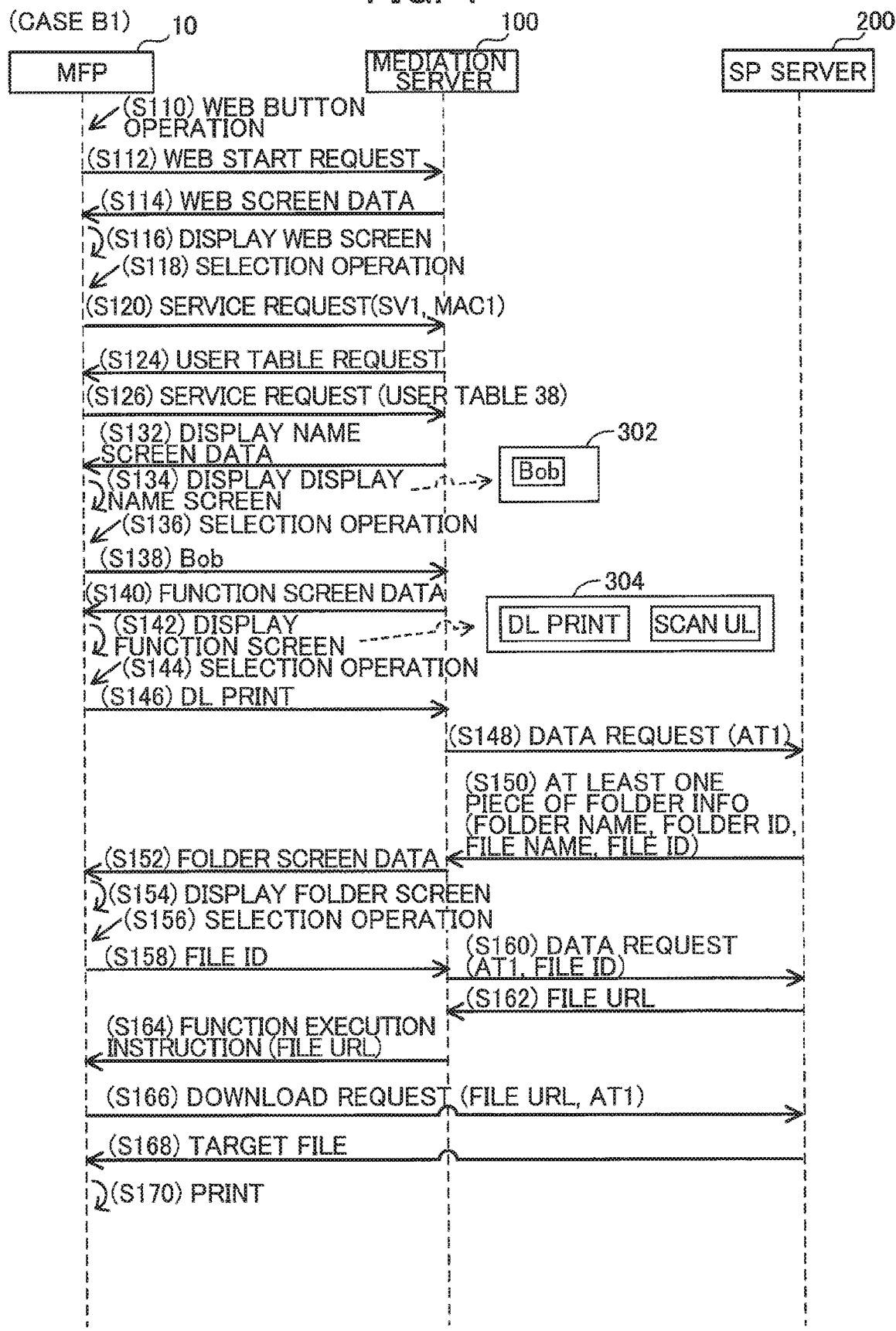
FIG. 4 is a sequence chart of Case B1 regarding supply of download service.

(Case B1 Regarding Download Service, FIG. 4)

A process of Case B1 will be explained while referring to FIG. 4. In Case B 1, the user of the MFP 10 corresponding to the display name "Bob" receives a download service from the SP server 200. Note that the mediation server 100 stores neither the group table 120 nor the device table 122 at the timing when the process of Case B1 and the process of Case B2 (described later) are started.

S110-S116 are the same as S30-S36 of FIG. 3. In S118 of Case B1, the user selects the service name "SV1" in the Web screen 300. In response to this user's selection, in S120 the CPU 112 receives a service request including the service name "SV1" and the MAC address "MAC1". The service request is a command for requesting that the SP server 200 provide the service. In S124 the CPU 112 transmits a user table request to the MFP 10. The user table request is a command for requesting transmission of the user table 38 (FIG. 2). In S126 the CPU 112 receives from the MFP 10 a service request including the user table 38.

In S132 the CPU 112 generates display name screen data by using the user table 38 received in S126 and the service name "SV1" received in S120. Specifically, the CPU 112 acquires the display name "Bob" correlated with the service name "SV1" from the user table 38, and generates the display name screen data including the display name "Bob". The CPU 112 transmits the display name screen data to the MFP 10 so that in S134 the display 14 of the MFP 10 displays a display name screen 302 based on the display name screen data. The display name screen 302 includes one display name selection button "Bob". In S136 the user selects the display name "Bob" thorough operation on the display name screen 302.

In S138 the CPU 112 receives the display name "Bob" from the MFP 10. In this case, in S140 the CPU 112 transmits prescribed function screen data to the MFP 10 so that in S142 the display 14 displays a function screen 304 based on the function screen data. The function screen 304 includes a plurality of function selection buttons such as "DL print" and "Scan UL". In Case B 1, in S144 the user selects the function name "DL print" through operation on the function screen 304.

In S146 the CPU 112 receives the function name "DL print" from the MFP 10. In this case, the CPU 112 acquires the AT1, which is correlated to both the service name "SV1" received in S120 and the display name "Bob" received in S138, from the user table 38 received in S126. In S148 the CPU 112 transmits to the SP server 200 a data request including the acquired AT1. The data request is a command for requesting authentication of the AT1 and transmission of at least one piece of folder information of at least one folder correlated to the AT1. In S150 the CPU 112 receives from the SP server 200 the at least one piece of folder information as a response to the data request. Each piece of folder information includes a folder name of the folder, a folder ID of the folder, file names of all image files included in the folder, and file IDs of all the image files.

In S152 the CPU 112 generates folder screen data by using the received folder information. The folder screen data represents a folder screen for selecting a target image file (hereinafter, referred to as "target file") which is a target for the DL print. The folder screen includes the at least one folder name of at least one folder and each file name in each folder. The CPU 112 transmits to the MFP 10 the folder screen data so that in S154 the display 14 displays the folder screen. In S156 the user selects a file name of the target file through operation on the folder screen.

In S158 the CPU 112 receives from the MFP 10 an file ID corresponding to the file name of the target file selected in S156. In this case, in S160 the CPU 112 transmits to the SP server 200 a data request including the AT1 and the file ID of the target file. The data request is a command for requesting authentication of the AT1 and transmission of information regarding the target file. In S162 the CPU 112 receives from the SP server 200 a file URL for accessing the target file. In S164 the CPU 112 transmits to the MFP 10 a function execution instruction including the file URL. The function execution instruction is a command for requesting execution of the DL print which includes downloading and printing the target file.

In S166 the MFP 10 transmits directly to the SP server 200 a download request without using the mediation server 100. The download request includes the file URL received in S164, and the AT1. The download request is a command for requesting authentication of the AT1 and transmission of the target file. In S168 the MFP 10 receives the target file from the SP server 200. In S170 the MFP 10 prints an image represented by the target file. In a conceivable case where in S166 the download request goes through the mediation server 100 to reach the SP server 200 and/or in S168 the target file goes through the mediation server 100 to reach the MFP 10, the target file, which may be personal for the user, goes through the mediation server 100, thereby giving discomfort to the user. In the embodiment, the target file does not go through the mediation server 100, thereby preventing from giving discomfort to the user.

Figure 5:
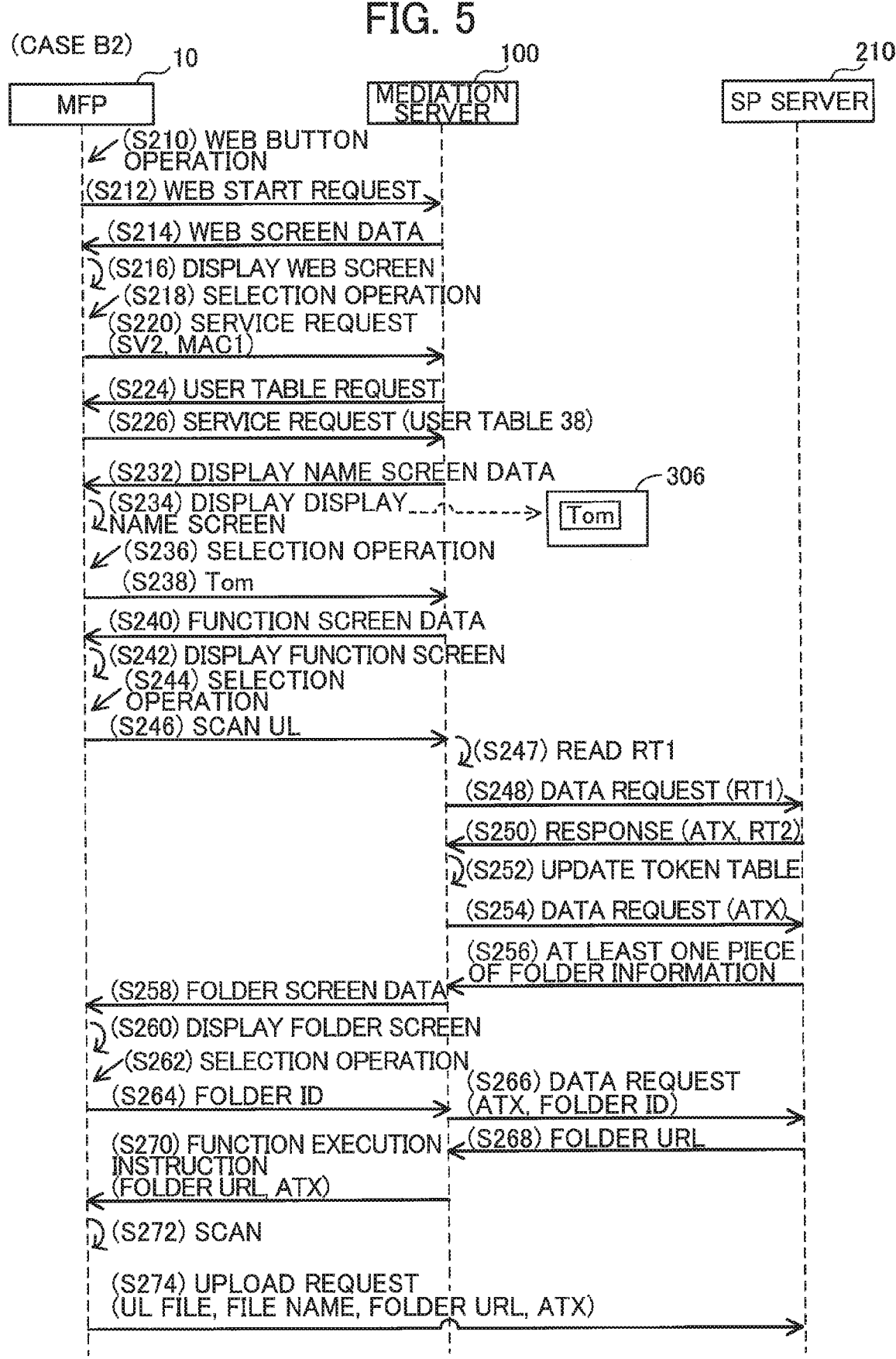
FIG. 5 is a sequence chart of Case B2 regarding supply of upload service.

(Case B2 Regarding Upload Service, FIG. 5)

A process of Case B2 where the user of the MFP 10 corresponding to the display name "Tom" receives an upload service from the SP server 210 will be explained while referring to FIG. 5.

S210-S216 are the same as S30-S36 of FIG. 3. In S218 of Case B2, the user selects the service name "SV2" in the Web screen 300. In response to this user's selection, in S220 the CPU 112 receives a service request including the service name "SV2" and the MAC address "MAC1". S224 and S226 are the same as S124 and S126 of FIG. 4.

In S232 the CPU 112 acquires the display name "Tom" correlated to the service name "SV2" from the user table 38 received in S226, and generates the display screen data including the display name "Tom". S234-S238 are the same as S134-S138 of FIG. 4 except that through S234-S238 the display name "Tom" is used instead of the display name "Bob".

S240 and S242 are the same as S140 and S142. In Case B2 in S244 the user selects function name Scan UL.

In S246 the CPU 112 receives the function name "Scan UL" from the MFP 10. In this case, the CPU 112 determines that, in the user table 38, there is no AT correlated to both the service name "SV2" received in S220 and the display name "Tom" received in S238. In S247 the CPU 112 acquires the RT1 correlated to all of the service name "SV2", the MAC address "MAC1", and the display name "Tom" from the token table 118 (FIG. 2). In S248 the CPU 112 transmits to the SP server 210 a data request including the acquired RT1. As a result, the SP server 210 authenticates the RT1, and generates a temporal access token "ATX" and a new refresh token "RT2". In S250 the CPU 112 receives from the SP server 210 a response including the ATX and the RT2.

In S252 the CPU 112 updates the token record 118*a* so that the RT1 is replaced to the RT2 received in S250. S254-S260 are the same as S148-S156 shown in FIG. 4 except the following points. That is, the access token ATX received in S250 is used instead of the AT1. Further, in S260 the CPU 112 displays a folder screen that includes the folder name, but does not include any file name. The folder screen is a screen for requiring selection of the folder (hereinafter, referred to as the target folder) for storing the image file. In S262 the user selects the folder name of the target folder through operation on the folder screen.

In S264 the CPU 112 receives a folder ID corresponding to the folder name of the target folder selected in S262. In this case, in S266 the CPU 112 transmits to the SP server 210 a data request including the ATX and the folder ID of the target folder. The data request is a command for requesting authentication of the ATX and transmission of information concerning the target folder. In S268 the CPU 112 receives from the SP server 210 a URL for accessing to the target folder. In S270 the CPU 112 transmits to the MFP 10 a function execution instruction including the folder URL and the ATX. The function execution instruction is a command for requesting execution of the scan UL including generating an image file by scanning an image, and uploading the image file to the target folder.

In S272 the MFP 10 scans an original sheet to generate an image file (hereinafter, referred to as a UL file) which is an upload target. In S274 the MFP 10 directly transmits to the SP server 210 an upload request without using the mediation server 100. Here, the upload request includes the generated UL file, a file name which is assigned to the UL file by the MFP 10, the folder URL received in S270, and the ATX received in S270. The upload request is a command for requesting to authenticate the ATX and to store the UL file in the target folder. According to the embodiment, the UL file does not goes through the mediation server 100, thereby preventing from giving discomfort to the user.

Figure 6:
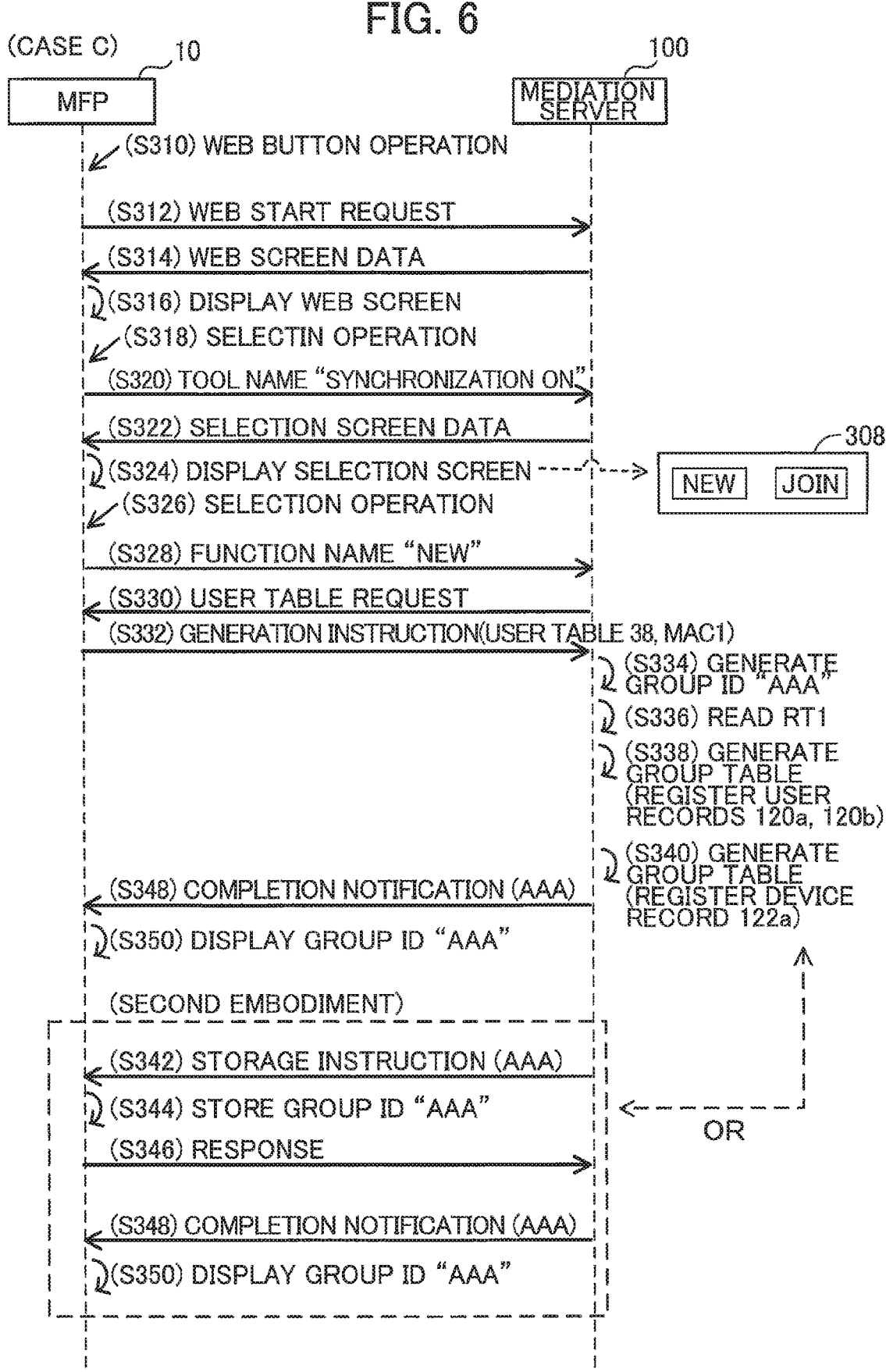
FIG. 6 is a sequence chart of Case C regarding formation of a new group.

(Case C Regarding Formation of New Group, FIG. 6)

A process of Case C for forming a new group by the user of the MFP 10 will be explained while referring to FIG. 6. In Case C the group is for the user of the MFP 10 to share each of the records (38a and 38b) registered in the user table 38 with other devices such as the MFP 50.

S310-S316 are the same as S30-S36 of FIG. 3. In S318 of Case C, the user selects a tool name "synchronization ON". According to this, in S320 the CPU 112 receives from the MFP 10 the tool name "synchronization ON". In S322 the CPU 112 transmits prescribed selection screen data to the MFP 10 so that in S324 the display 14 displays a selection screen 308 represented by the selection screen data. The selection screen 308 includes two function selection buttons, that is a "new" button and a "join" button. In Case C, in S326 the user selects the function name "new".

In S328 the CPU 112 receives the function name "new" from the MFP 10. In S330 the CPU 112 transmits a user table request to the MFP 10, and in S332 receives from the MFP 10 a generation instruction including the user table 38 and the MAC address "MAC1". The generation instruction is a command for requesting generation of a group.

In S334 the CPU 112 generates the group ID "AAA" for identifying a new group. In S336 the CPU 112 acquires (or reads) from the token table 118 (FIG. 2) the RT1 which is included in the token record 118a and is correlated with the user record 38b (specifically, the "SV2" and the "Tom") in the user table 38 received in S332. In S338 the CPU 112 generates the group table 120 (FIG. 2) by using the group ID "AAA" generated in S334, the records 38a and 38b in the user table 38 received in S332, and the RT1 acquired in S336. Accordingly, the group ID "AAA", and the two user records 120a and 120b are registered in the group table 120 so that the group ID "AAA" is correlated with both the user records 120a and 120b. Here, the user record 120a is based on the user record 38a, the user record 120b is based on the user record 38b and the token record 118a which is correlated with the user record 38b. In S340 the CPU 112 generates the device table 122 (FIG. 2) by using the group ID "AAA" generated in S334, and the MAC address "MAC1" received in S332. Accordingly, the device record 122a, in which the group ID "AAA" and the MAC address "MAC1" are correlated with each other, is registered in the device table 122.

In S348 the CPU 112 transmits to the MFP 10 a completion notification including the group ID "AAA" so that in S350 the display 14 displays the group ID "AAA". Accordingly, the user can know the group ID "AAA".

Figure 7:
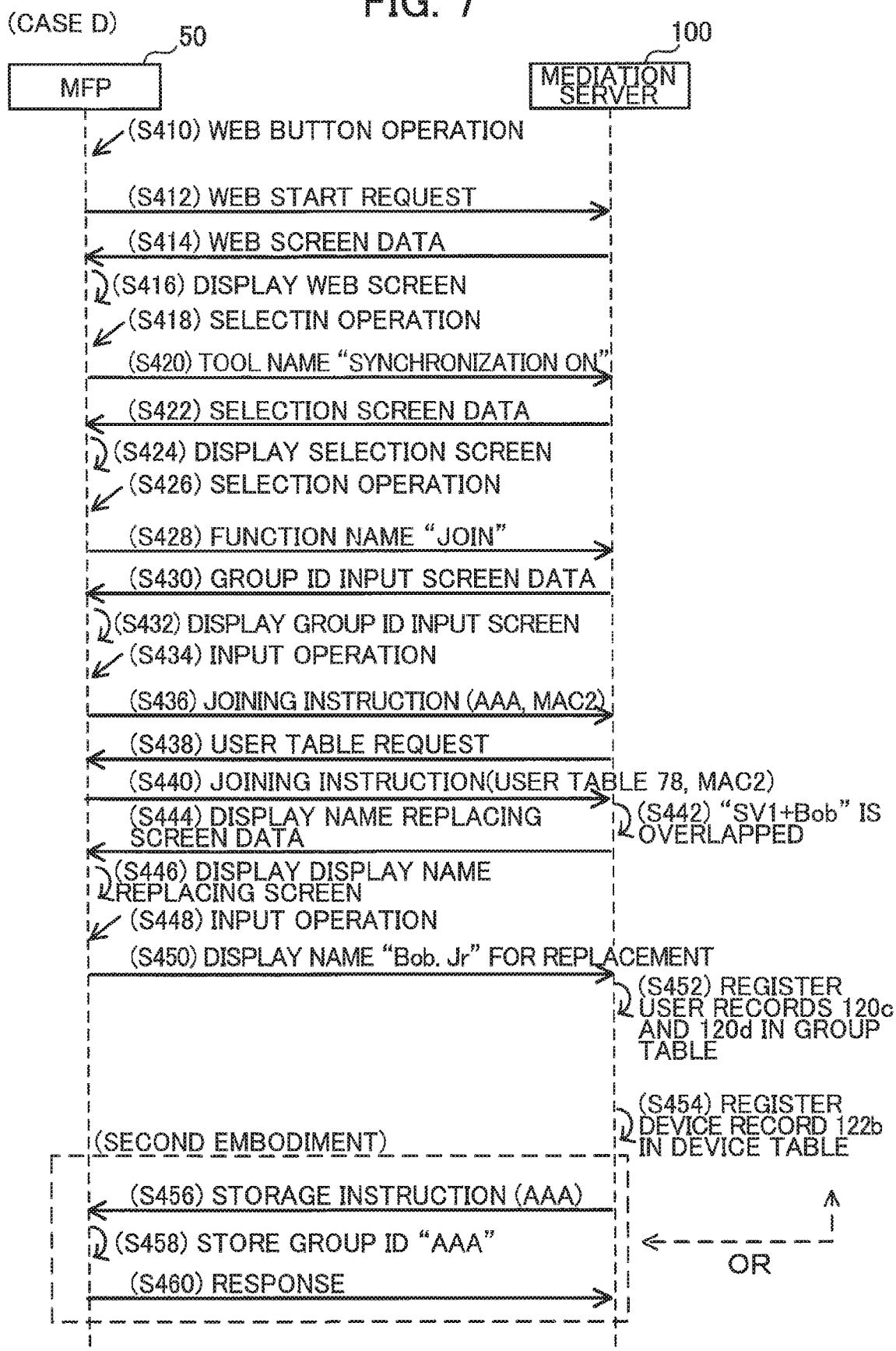
FIG. 7 is a sequence chart of Case D regarding joining the group.

(Case D Regarding Joining Group, FIG. 7)

A process for the MFP 50 to join the new group generated in the process shown in FIG. 6 will be explained while referring to FIG. 7.

S410-S424 are the same as S310-S324 of FIG. 6 except that the MFP 50 communicates with the mediation server 100. In S426 of Case D, the user selects the tool name "join". According to this, in S428 the CPU 112 receives from the MFP 50 the tool name "join". In S430 the CPU 112 transmits prescribed group ID input screen data to the MFP 50 so that in S432 a display (not shown) of MFP 50 displays a group ID input screen represented by the group ID input screen data. The group ID input screen is for requesting input of the group ID. In Case D, in S434 the user inputs the group ID "AAA" which was displayed on the MFP 10 in S350 (FIG. 6).

In S436 the CPU 112 receives from the MFP 50 a joining instruction including the group ID "AAA" inputted in S434 and the MAC address "MAC2" of the MFP 50. The joining instruction is a command for requesting participation in the group identified by the group ID "AAA". In S438 the CPU 112 transmits a user table request to the MFP 50 and in S440 receives from the MFP 50 a joining instruction including the user table 78 (FIG. 2) and the MAC address "MAC2".

As shown in FIG. 2, a combination of the SV1 and the Bob in the user record 78b in the user table 78 matches a combination of the SV1 and the Bob in the user record 120a in the group table 120. Accordingly, in S442 the CPU 112 determines that these two combinations are overlapped with each other. In S444 the CPU 112 transmits to the MFP 50 display name replacing screen data so that in S446 the display (not shown) of the MFP 50 displays a display name replacing screen represented by the display name replacing screen data. The display name replacing screen is a display for requiring to rename the display name. In Case D in S448 the user inputs a new display name "Bob. Jr" for replacing the display name "Bob".

In S450 the CPU 112 receives from the MFP 50 the display name "Bob. Jr" for replacement. In S452 the CPU 112 registers the two user records 120c and 120d to be correlated to the group ID "AAA" received in S436 in the group table 120 by using the records 78a and 78b in the user table 78 received in S440 and the display name "Bob. Jr" received in S450. Here, the user record 120d is based on the user record 78b with replacing the display name "Bob" with "Bob. Jr". In S454 the CPU 112 registers the device record 122b in the device table 122 (FIG. 2) so that the group ID "AAA" and the MAC address "MAC2" which are received in S436 are correlated to each other.

According to each process described above, the MFP 50 joins the group formed by the MFP 10 in the process shown in FIG. 6. Accordingly, the MFPs 10 and 50 can share the AT1 and the RT1 registered in the user table 38 and the token table 118, and also share the AT2 and the AT3 registered in the user table 78. Further, in S442 and S444, the CPU 112 registers the changed display name "Bob. Jr" in the user record 120d when the combinations of the SV1 and the Bob are overlapped with each other. This configuration can prevent the registration of the two or more user records having the same combination of the service name and the display name.

Figure 8:
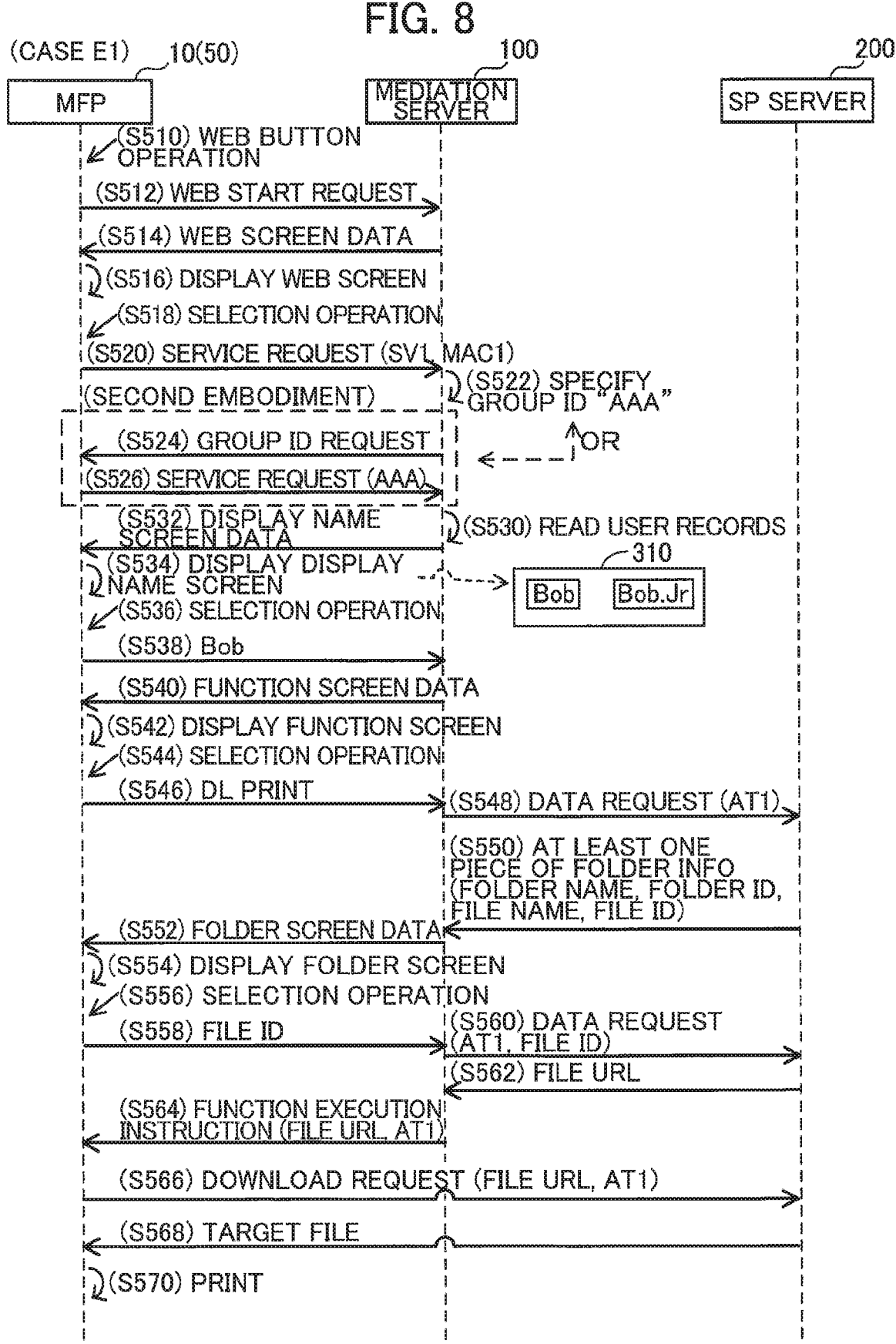
FIG. 8 is a sequence chart of Case E1 regarding supply of download service after the group is formed.

(Case E1 Regarding Download Service after Group is Formed, FIG. 8)

A process of Case E1 will be explained while referring to FIG. 8. In Case E1 the user corresponding to the display name "Bob" receives a download service from the SP server 200 by using the MFP 10 after the group, which the MFPs 10 and 50 join, is formed through the processes shown in FIGS. 6 and 7. Note that a similar process is performed when the user uses the MFP 50 instead of the MFP 10.

S510-S520 are the same as S110-S120 of FIG. 4 (Case B1). In S522 of Case E1, the CPU 112 specifies the group ID "AAA" correlated to the MAC address "MAC1" received in S520 by referring to the device table 122. In S530 the CPU 112 acquires or reads from the group table 120 the two user records 120a and 120d including the SV1 received in S520, among the four records 120a-120d correlated to the specified group ID "AAA". In S532 the CPU 112 transmits to the MFP 10 display name screen data including the two display names "Bob" and "Bob. Jr" in the acquired two user records 120a and 120d so that in S534 the display 14 displays a display name screen 310 based on the display name screen data. In Case E1, in S536 the user selects the display name "Bob" through operation on the display name screen 310.

S538-S562 are the same as S138-S162 shown in FIG. 4 except the following points. That is, in S546 the CPU 112 acquires from the group table 120 the AT1 correlated to the MAC address "MAC1" received in S520, the group ID "AAA" identified in S522, and the display name "Bob" received in S538, by referring to the device table 122. S564 is the same as S164 shown in FIG. 4 except that the function execution instruction further including the AT1. That is, the function execution instruction is a command for requesting execution of the DL print using the AT1 acquired in S546. S566-S570 are the same as S166-S170 shown in FIG. 4.

As described above, in Case E1, in S520 the CPU 112 receives a service request including the MAC address "MAC1" from the MFP 10. In this case, the CPU 112 performs communication (S548-S552, and S558-S564) for the MFP 10 to receive the download service from the SP server 200 by using the AT1 which is correlated with the MAC address "MAC1" via the group table 120 and the device table 122. In a case where in S520 the CPU 112 receives a service request including the MAC address "MAC2" from the MFP 50, the CPU 112 performs communication (S548-S552, and S558-S564) for the MFP 50 to receive the download service from the SP server 200 by using the AT1 which is correlated with the MAC address "MAC2" via the group table 120 and the device table 122. According to Case E1, the MFPs 10 and 50 can share the same access token AT1. For example, when the MFPs 10 and 50 are located in one office, a plurality of users wishes to use both the MFPs 10 and 50. Because the MFPs 10 and 50 can share the same AT, each user can receive the download service from the SP server 200 by using any one of the MFPs 10 and 50.

Figure 9:
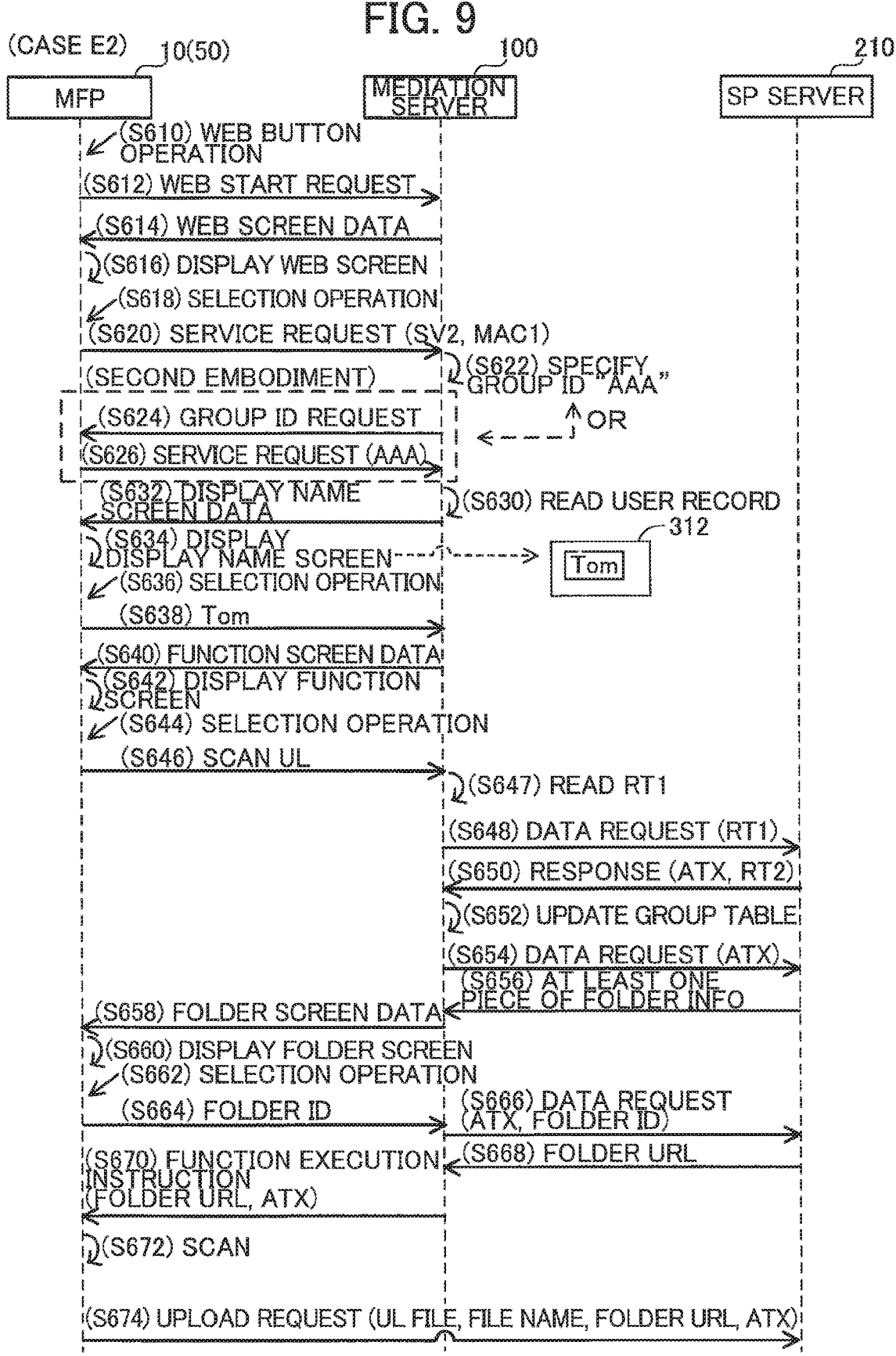
FIG. 9 is a sequence chart of Case E2 regarding supply of upload service after the group is formed.

(Case E2 Regarding Upload Service after Group is Formed, FIG. 9)

A process of Case E2 will be explained while referring to FIG. 9. In Case E2, the user corresponding to the display name "Tom" receives an upload service from the SP server 210 by using the MFP 10 after the group, which the MFPs 10 and 50 join, is formed through the processes shown in FIGS. 6 and 7. Note that a similar process is performed when the user uses the MFP 50 instead of the MFP 10.

S610-620 are the same S210-S220 shown in FIG. 5. S622 is the same as S522 of FIG. 8. In S630 the CPU 112 acquires (or reads) from the group table 120 the user record 120b which includes the SV2 received in S620 among the four records 120a-120d correlated with the group ID "AAA". In S632 the CPU 112 transmits to the MFP 10 display name screen data including the display name "Tom" in the acquired user record 120b so that in S634 the display 14 displays a display name screen 312 based on the display name screen data. In Case E2, in S636 the user selects the display name "Tom" through operation on the display name screen 312.

S638-S646 are the same as S238-S246 shown in FIG. 5. In S647 the CPU 112 acquires the RT1 correlated to the group ID "AAA", the service name "SV2", and the display name "Tom" from the group table 120 by referring to the device table 122 (FIG. 2). S648 and S650 are the same as the S248 and S250 shown in FIG. 5. In S652 the CPU 112 changes the refresh token in the user record 120b from the RT1 to the RT2. S654-S674 are the same as S254-S274 shown in FIG. 5.

In Case E2, in S620 the CPU 112 receives a service request including the MAC address "MAC1" from the MFP 10. In this case the CPU 112 performs communication (S648-S658, and S664-S670) with the MFP 10 and the SP server 210 for the MFP 10 to receive the upload service from the SP server 210 by using the RT1 correlated to the MAC address "MAC1" in the group table 120 and the device table 122. In a case where in S620 the CPU 112 receives a service request including the MAC address "MAC2" from the MFP 50, the CPU 112 performs communication (S648-S658, and S664-S670) for the MFP 50 to receive the upload service from the SP server 210 by using the RT1 correlated with the MAC address "MAC2". According to Case E2, the MFPs 10 and 50 can share the same refresh token RT1. For example, the plurality of users in the office can receive the upload service from the SP server 210 by using any one of the MFPs 10 and 50.

Figure 10:
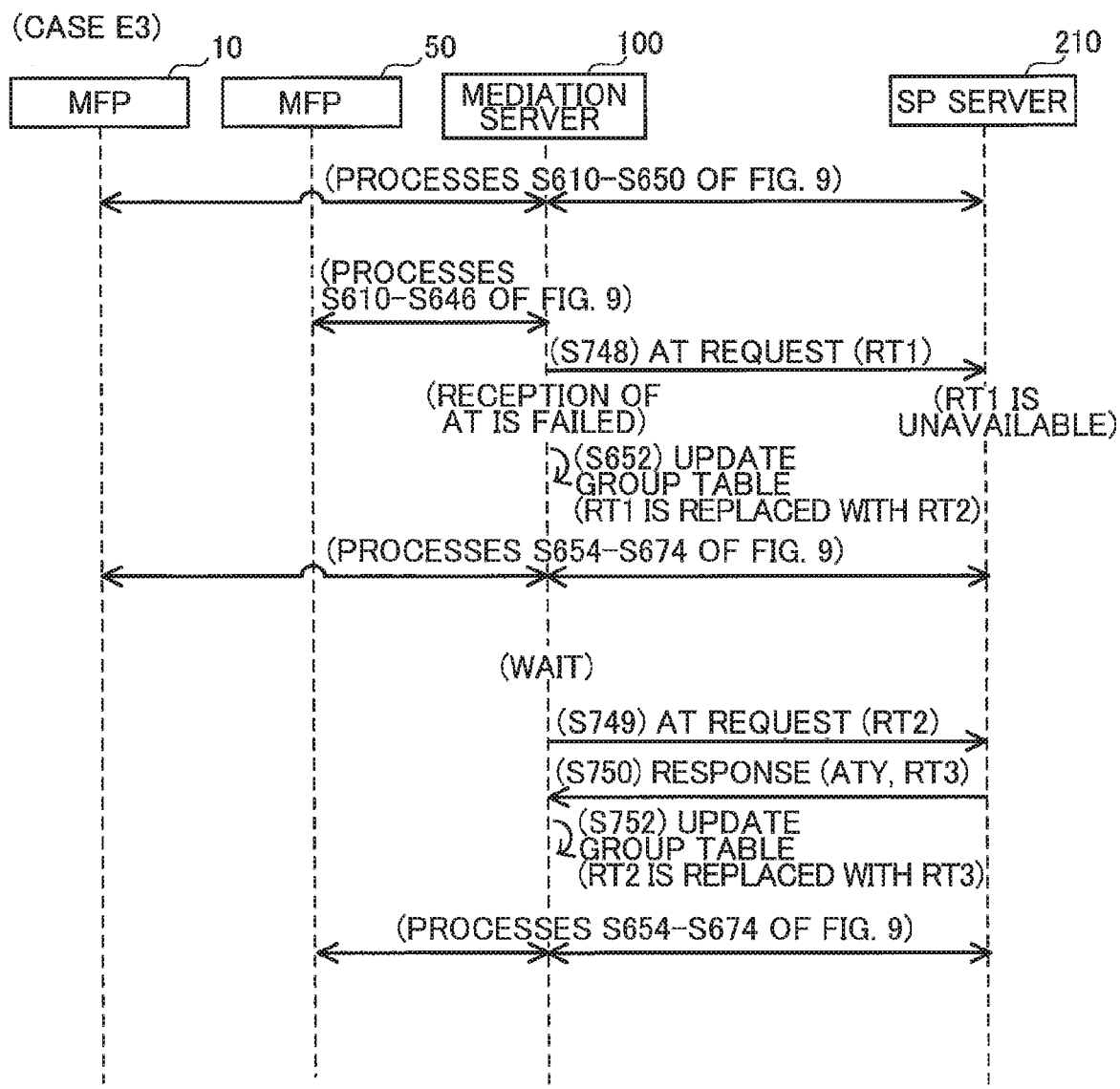
FIG. 10 is a sequence chart of Case E3 where reception of an access token is failed.

(Case E3 where Reception of Access Token is Failed, FIG. 10)

A process of Case E3 will be explained while referring to FIG. 10. In Case E3, the user corresponding to the display name "Tom" receives upload services from the SP server 210 by using the MFPs 10 and 50 substantially simultaneously.

In Case E3, at first, S610-S650 shown in FIG. 9 are performed among the MFP 10, the mediation server 100, and the mediation server 100. Next, before the RT1 in the group table 120 is replaced to the RT2, that is, before the execution of S652, secondly, S610-S646 are performed among the MFP 50 and the mediation server 100. In response to reception of the function name "Scan UL" from the MFP 50 (S646), in S748 the CPU 112 transmits to the SP server 210 a data request including the RT1. Note that the SP server 210 has already updated the refresh token from the RT1 to the RT2 in S650. As a result, the SP server 210 cannot use (or authenticate) the RT1 at this timing. That is, the authentication using the RT1 is failed, and the SP server 210 transmits neither a new RT nor AT as a response to the data request received in S748. Accordingly, the CPU 112 fails to receive the AT which is required when the MFP 50 executes the Scan UL.

Thereafter, S652 of FIG. 9 is performed. That is, in S652 the CPU 112 changes the refresh token in the user record from the RT1 to the RT2. Further, S654-S674 shown in FIG.

9 are performed among the MFP 10, the mediation server 100, and the SP server 210 by using the ATX.

On the other hand, concerning communication with the MFP 50, the CPU 112 waits a prescribed period of time after failure of receiving the AT required when the MFP 50 executes the Scan UL. In Case E3, during the prescribed period of time, the group table 120 is changed in S652. Subsequently, in S749 the CPU 112 transmits to the SP server 210 a data request including the updated refresh token RT2. In S750 the CPU 112 receives from the SP server 210 a response including a new access token "ATY" and a new refresh token "RT3".

In S752 the CPU 112 updates the refresh token in the user record 120b from the RT2 to the RT3 received in S750. Subsequently, S654-S674 shown in FIG. 9 are performed among the MFP 50, the mediation server 100, and the SP server 210, by using the ATY.

As described above, the CPU 112 waits the prescribed period of time after reception of the AT from the SP server 210 is failed. Further, after the refresh token in the group table 120 is updated from the RT1 to the RT2, the CPU 112 transmits the data request including the RT2 to the SP server 210 (S749). Accordingly, the CPU 112 receives from the SP server 210 the response including the ATY and the RT3, thereby completing the upload service using the ATY. In a situation where the user(s) wishes to receive upload services by using the MFPs 10 and 50 simultaneously, the MFPs 10 and 50 can complete upload services properly.

Figure 11:
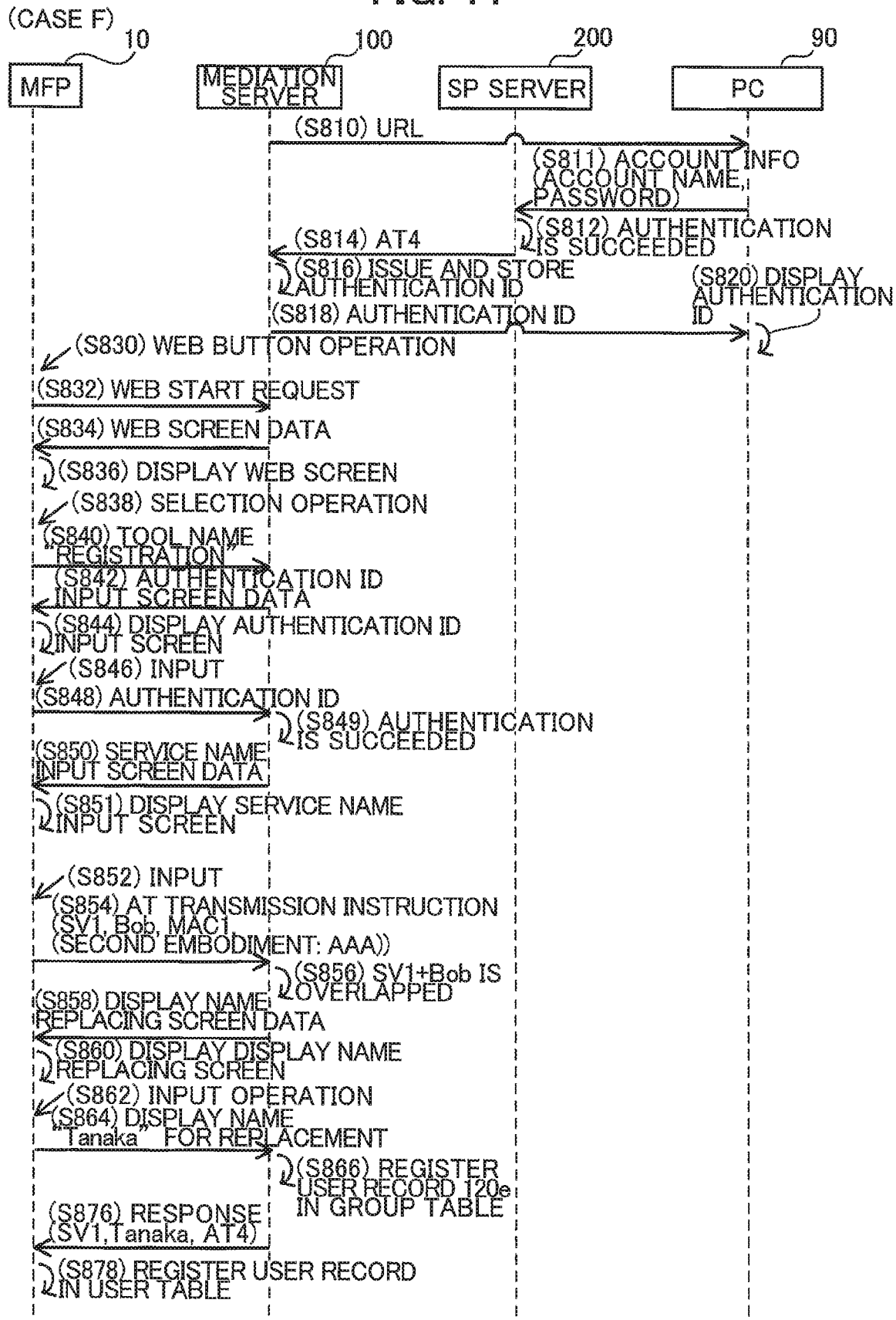
FIG. 11 is a sequence chart of Case F regarding registration of user information after the group is formed.

(Case F Regarding Registration of User Record after Group is Formed, FIG. 11)

Case F will be explained while referring to FIG. 11. In Case F a process for further registering a user record in the group table 120 is executed.

S810-S854 are the same as S10-S54 of FIG. 3 except that the access token AT4 is generated and used instead of the AT1, and the AT transmission instruction transmitted in S854 further includes the MAC address "MAC1". In S856 of Case F, the CPU 112 determines that the MFP 10 has joined the group identified by the group ID "AAA" because the MAC address "MAC1" included in the AT transmission instruction received in S854 has already been stored in the device table 122. Accordingly, the CPU 112 determines that a new user record including the combination of the SV1 and the Bob in the AT transmission instruction should be registered in the group table 120. Subsequently, the CPU 112 determines that the above described combination already exists in the group table 120 (see the user record 120a in FIG. 2). In this case, S858-864 are performed similarly to S444-S450 in FIG. 7. Note, in this case, in S864 the CPU 112 receives a display name "Tanaka" for replacement of the display name "Bob". In S866 the CPU 112 registers in the group table 120 a new user record 120e including the SV1 received in S854, the display name "Tanaka" received in S864, and the AT4 correlated to authentication ID by which the authentication is succeeded in S849. S876 and S878 are the same as S54 and S58 except that the SV1, the Tanaka, and the AT4 are used.

In a case where the AT transmission instruction received in S854 includes the combination of the SV1 and the Tanaka instead of the combination of the SV1 and the Bob, the CPU 112 performs S866 without executing S856-S864.

According to Case F, the user record 120e can be further registered in the group table 120 after the group, which the MFPs 10 and 50 participates, has been formed through the above described processes shown in FIGS. 6 and 7. The newly registered user record 120e can be used similarly to the user records 120a-120d. That is, the MFPs 10 and 50 can share the newly registered AT4. Further, the mediation server 100 can prevent from overlap registration of the same combination of the service name and the display name through S856-S866.

(Correspondences)

The MFPs 10 and 50 are respectively examples of a first communication apparatus and a second communication apparatus. The MAC addresses MAC1 and MAC2 are respectively an example of first identification information and an example of second identification information. The MAC addresses MAC1 and MAC2 are examples of association information. The group ID "AAA" is an example of group identification information. The AT1 in the process of FIG. 8 and the RT1 in the process of FIG. 9 are examples of first authentication information. The AT2 and AT3 included in the user table 78 used in S440 of FIG. 7 are examples of second authentication information. The AT4 used in S814 (FIG. 11) is an example of third authentication information. The RT2 used in the processes in FIGS. 9 and 10 is an example of new authentication information. The ATX and the ATY used in the processes of FIGS. 9 and 10 are respectively examples of first temporary information and the second temporary information.

Each communication for the MFP 10 to receive services from the SP server (S546-S552 and S558-S564 shown in FIG. 8, S646-S658 and S664-S670 shown in FIG. 9) is an example of first communication. Each communication for the MFP 50 to receive services from the SP server (S546-S552 and S558-S564 shown in FIG. 8, S646-S658 and S664-S670 shown in FIG. 9) is an example of second communication. The service requests received from the MFP 10 in S520 (FIG. 8) and in S620 (FIG. 9) are examples of a first request. The service requests received from the MFP 50 in S520 (FIG. 8) and in S620 (FIG. 9) are examples of a second request. The generation instruction in S332 of FIG. 6 is an example of a group generation instruction. The joining instructions in S436 and S440 (FIG. 7) are examples of group joining instruction. The AT transmission instruction in S854 of FIG. 11 is an example of a registration instruction. S340 of FIG. 6 is an example of a joining process.

The combination of the SV1 and the Bob is an example of first user identification information. The user record 120a is an example of first correlation information. The combination of the SV1 and the Bob (see the record 78b in FIG. 2), and the combination of the SV3 and the Alice (see the record 78a in FIG. 2) are examples of second user identification information. The user records 120c and 120d are respectively examples of second correlation information and specific correlation information. When the AT transmission instruction received in S854 of FIG. 11 includes the combination of the SV1 and the Bob, the combination and the user record 120e registered in S866 are respectively examples of third user identification information and fourth correlation information. When the AT transmission instruction received in S854 of FIG. 11 includes the combination of the SV1 and the Tanaka, the combination and the user record 120e registered in S866 are respectively examples of fourth user identification information and third correlation information.

Second Embodiment

In a second embodiment, the memory 114 of the mediation server 100 does not store the device table 122 (FIG. 2). Further, part of the processes shown in FIGS. 6-11 are different from the first embodiment as described below.

(Case C, FIG. 6)

In the second embodiment, in the process shown in FIG. 6, S342-S346 are performed instead of S340. In S342 the CPU 112 transmits to the MFP 10 a storage instruction including the group ID "AAA" generated in S338. The storage instruction is a command for requesting to store the group ID "AAA" in the memory 34 of the MFP 10. According to this, in S344 the group ID "AAA" is stored in the memory 34. In S346 the CPU 112 receives from the MFP 10 a response indicating that the group ID "AAA" is stored in the memory 34. Subsequently, S348 and S350 are performed similarly to the first embodiment.

(Case D, FIG. 7)

In the second embodiment, in the process shown in FIG. 7, S456-S460 are performed instead of S454. In S456 the CPU 112 transmits to the MFP 50 a storage instruction including the generated group ID "AAA". According to this, in S458 the group ID "AAA" is stored in the MFP 50. In S460 the CPU 112 receives from the MFP 50 a response indicating that the group ID "AAA" is stored in the MFP 50.

(Cases E1 and E2, FIGS. 8 and 9)

In the second embodiment, in the process shown in FIGS. 8, S524 and S526 are performed instead of S522. In S524, the CPU 112 transmits a group ID request to the MFP 10. The group ID request is a command for requesting transmission of the group ID stored in the MFP 10. In S546 the CPU 112 acquires from the group table 120 the AT1 correlated to the MAC address "MAC1" received in S520, the group ID "AAA" received in S526, and the display name "Bob" received in S538. In S526 the CPU 112 receives from the MFP 10 a service request including the group ID "AAA" stored in S344 (FIG. 6). Further, in the process shown in FIGS. 9, S624 and S626 are performed instead of S622. S624 and S626 are the same as S524 and S526 in FIG. 8. In S647 the CPU 112 acquires the RT1 correlated to the group ID "AAA" received in S626, the service name "SV2", and the display name "Tom" from the group table 120.

(Case F, FIG. 11)

In the second embodiment, the AT transmission instruction received in S854 includes the group ID "AAA" stored in S344 (FIG. 6). Accordingly, the CPU 112 can determine that the MFP 10 has joined in the group identified by the group ID "AAA". As a modification of the second embodiment, the AT transmission instruction in S854 may not include the MAC address "MAC1". The remaining processes from S856 are the same as the first embodiment.

(Correspondences)

The group ID "AAA" is an example of association information. The service requests received from the MFP 10 in S526 (FIG. 8) and in S626 (FIG. 9) are examples of a first request. The service requests received from the MFP 50 in S526 (FIG. 8) and in S626 (FIG. 9) are examples of a second request. S342 of FIG. 6 is an example of a joining process.

While the disclosure has been described in detail with reference to the above embodiments, it would be apparent to those skilled in the art that various changes and modifications may be made thereto.

(Modification 1) User records may be registered in the user tables 38 and 78 so that in each record, the service name, the display name, and the account information (an account name and a password) are correlated with each other. Similarly, user records may be registered in the group table 120 so that in each user record, the group ID, the service name, the display name, and the account information are correlated with each other. Instead of the AT1, the account information may be included in the data requests of S148 and S160 in FIG. 4, the download request of S166 in FIG. 4, the data requests of S548 and S560 in FIG. 4, and the download request of S566. Further, instead of the RT1, the account information may be included in the data request of S248 in FIG. 5, and the data requests of S648 in FIGS. 9 and 10. In the modification 1, the account information is an example of first authentication information.

(Modification 2) The user table 38 may not be stored in the memory 34 of the MFP 10 and the user table 78 may not be stored in the memory 74 of the MFP 50. In this case, the memory 114 of the mediation server 100 may store tables corresponding to the user tables 38 and 78, or a unified table thereof. In this case, when the access token is received from the SP server, the CPU 112 may generate the table including the access token and store the generated table. In the modification 2, at least one of S330 and S332 of FIGS. 6, S438 and S440 of FIG. 7 may not be performed. The process executed in the modification 2 is an example of acquiring.

(Modification 3) The group ID (that is, AAA) may not be generated. Specifically, in the process shown in FIG. 6, S334 may not be performed. Further, in S338 a table correlating the MAC1 with the AT1 and the RT1 may be generated, and S340 may not be performed. Subsequently, in S348 and S350 the MAC1 may be displayed on the MFP 10. In S434 of FIG. 7 the MAC1 may be inputted, and in S436 a joining instruction including the MAC1 and the MAC2 may be transmitted. In S452 a table correlating the MAC1, the MAC2, and the AT1-AT3 and the RT1 with each other may be generated. That is, in the modification 3, the MAC1 is used instead of the group ID.

(Modification 4) None of S438, S440, and S452 in FIG. 7 may be performed. That is, when the MFP 50 joins the group, no information in the user table 78 in the MFP 50 may not be stored in the group table 120. In this case, the MFPs 10 and 50 share the AT1 and the RT1 registered respectively in the user table 38 and the token table 118, but shares neither AT2 nor the AT3 stored in the user table 78.

(Modification 5) When the combination of the service name and the display name is determined to be overlapped with another combination in S442 (FIG. 7) or in S856 (FIG. 11), the CPU 112 may not perform S444 or S858, and automatically change one of the overlapping display names.

(Modification 6) S348, S350, S342-S350 shown in FIG. 6 may not be performed. That is, the CPU 112 may not output the group ID "AAA" to an external apparatus. In this case, in S436 of FIG. 7 the CPU 112 may receive from the MFP 50 a joining instruction which does not include the group ID. In this case, in S452 the CPU 112 may registers, in the group table 120 (FIG. 2), the user records 120c and 120d correlated to the group ID "AAA". In S454 the CPU 112 may register, in the device table 122 (FIG. 2), a device record 122b so that the group ID "AAA" is correlated to the MAC address "MAC2".

(Modification 7) The CPU 112 may generate an email describing the group ID "AAA", and transmit the email toward a prescribed destination (for example, the MFP 50), instead of S348 of FIG. 6. That is, the CPU 112 may transmit the group ID "AAA" to a destination other than the MFP 10.

(Modification 8) In each embodiment, both the process of S340 and the process of S342-S346 (FIG. 6) may be performed. That is, the CPU 112 may register the device record 122a in the device table 122 and transmit the group ID "AAA" to the MFP 10. In the modification 8, S340 and S342 of FIG. 6 are examples of a joining process.

(Modification 9) The process shown in FIG. 11 may not be performed. That is, once the group which the MFPs 10 and 50 participate is formed through the processes shown in FIGS. 6 and 7, a new user record may not be registered in the group table 120.

(Modification 10) When reception of the AT for the MFP 50 to execute the Scan UL is failed in response to the data request transmitted in S748 (FIG. 10), the CPU 112 may terminate the process with error without performing S749.

(Modification 11) In the above embodiments, each process shown in FIGS. 3-11 is executed by executing processes which the CPU 112 of the mediation server 100 performs according to the software. Alternatively, at least part of the processes shown in FIGS. 3-11 may be performed by hardware such as a logical circuit.

In the above described processes, the SP server 220 may be used instead of the SP server 200. Further, the service name SV3, which is the service name of the SP server 220, may be recorded in tables 38, 78, 120 through the above described processes, similarly to the SV1.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility. Any combination of the configurations and the processes explained in the embodiments and the modification may be used for achieving one of the objects.

What is claimed is:

1. A mediation server comprising:
   a communication interface communicable with a first service provider server, a first communication apparatus, and a second communication apparatus different from the first communication apparatus;
   a processor; and
   a memory storing computer-readable instructions therein, the computer-readable instructions, when executed by the processor, causing the mediation server to perform:
   acquiring, from the first service provider server, first authentication information for receiving a first service;
   registering association information and the first authentication information in the memory and correlating the association information with the first authentication information, the association information including first identification information identifying the first communication apparatus and second identification information identifying the second communication apparatus, the second identification information being different from the first identification information;
   in a case where a first request including the first identification information is received by the mediation server and from the first communication apparatus, performing first communication with the first communication apparatus and the first service provider server by transmitting to the first service provider server the first authentication information correlated with the first identification information in the memory, the first communication being for the first communication apparatus to receive the first service from the first service provider server; and
   in a case where a second request including the second identification information is received by the mediation server and from the second communication apparatus, performing second communication with the second communication apparatus and the first service provider server by transmitting to the first service provider server the first authentication information correlated with the second identification information in the memory, the second communication being for the second communication apparatus to receive the first service from the first service provider server.

2. The mediation server according to claim 1, wherein the registering registers, in the memory, group identification information, the first authentication information, the first identification information, and the second identification information correlated with one another, the group identification information identifying a group to which the first communication apparatus and the second communication apparatus join.

3. The mediation server according to claim 2, wherein the computer-readable instructions, when executed by the processor, further cause the mediation server to perform generating the group identification information in a case where a group generation instruction is received from the first communication apparatus.

4. The mediation server according to claim 3, wherein the acquiring acquires the first authentication information which is received from the first communication apparatus in the case where the group generation instruction is received from the first communication apparatus, and
   wherein in the case where the group generation instruction is received from the first communication apparatus, the registering registers the first authentication information and the group identification information in the memory so as to be correlated with each other.

5. The mediation server according to claim 3, wherein the registering performs a joining process for allowing the second communication apparatus to join a group in a case where a group joining instruction is received from the second communication apparatus, and
   wherein the generating does not generate new group identification information in the case where the group joining instruction is received from the second communication apparatus.

6. The mediation server according to claim 5, wherein the joining process includes a process for registering the second identification information and the group identification information in the memory so as to be correlated with each other.

7. The mediation server according to claim 5, wherein the computer-readable instructions, when executed by the processor, further cause the mediation server to perform transmitting the group identification information to the first communication apparatus, and
   wherein the registering performs the joining process in a case where the group joining instruction and the group identification information are received from the second communication apparatus, wherein transmission of the group joining instruction and the group identification information from the second communication apparatus is triggered by input of the group identification information to the second communication apparatus after the group identification information is transmitted to the first communication apparatus.

8. The mediation server according to claim 5, wherein the communication interface is configured to communicate with a second service provider server, and
   wherein the registering further registers second authentication information different from the first authentication information in the memory so as to be correlated with the group identification information in a case where the group joining instruction and the second authentication information are received from the second communication apparatus, wherein the second authentication information is needed for receiving a second service from the second service provider server.

9. The mediation server according to claim 8, wherein the memory registers first correlation information and the group identification information correlated with each other, the first correlation information correlating the first authentication information with first user identification information identifying a first user who can use the first authentication information,
- wherein in a case where the group joining instruction, the second authentication information, and second user identification information different from the first user identification information are received, the registering further registers second correlation information so as to be correlated with the group identification information in the memory, wherein the second user identification information identifies a second user who can use the second authentication information, the second correlation information correlating the second authentication information with the second user identification information, and
- wherein in a case where the group joining instruction, the second authentication information, and third user identification information matching the first user identification information are received, the registering further registers specific correlation information so as to be correlated with the group identification information in the memory, the specific correlation information correlating the second authentication information with specific user identification information different from the third user identification information.

10. The mediation server according to claim 1, wherein the communication interface is configured to communicate with a second service provider server, and
- wherein in a case where a registration instruction and the association information is received from the first communication apparatus after the first authentication information and the association information are registered in the memory in correlation with each other, the registering further registers second authentication information so as to be correlated with the association information in the memory, the second authentication information being needed for receiving a second service from the second service provider server, the second authentication information being different from the first authentication information.

11. The mediation server according to claim 10, wherein the memory registers first correlation information and the association information correlated with each other, the first correlation information correlating the first authentication information with first user identification information, the first user identification information identifying a first user who can use the first authentication information,
- wherein in a case where the registration instruction, the association information, and second user identification information different from the first user identification information are received, the registering registers second correlation information so as to be correlated with the association information in the memory, wherein the second user identification information identifies a second user, the second correlation information correlating the second authentication information with the second user identification information, and
- wherein in a case where the registration instruction, the association information, and third user identification information matching the first user identification information are received, the registering registers third correlation information so as to be correlated with the association information in the memory, the third correlation information correlating the second authentication information with fourth user identification information different from the second user identification information.

12. The mediation server according to claim 1, wherein the performing first communication includes:
- in the case where the first request is received from the first communication apparatus, transmitting the first authentication information to the first service provider server;
- receiving first temporary information from the first service provider server in response to transmission of the first authentication information, wherein the first temporary information is used temporarily for receiving the first service from the first service provider server; and
- transmitting the first temporary information to the first communication apparatus.

13. The mediation server according to claim 12, wherein the performing first communication further includes receiving the first temporary information and new authentication information from the first service provider server in response to transmission of the first authentication information, the new authentication information being for replacing the first authentication information,
- wherein in a case where the new authentication information is received, the registering registers in the memory the new authentication information by replacing the first authentication information with the new authentication information, and
- wherein the performing second communication includes:
  - transmitting the first authentication information to the first service provider server in response to reception of the second request from the second communication apparatus before the new authentication information is registered in the memory and after the first authentication information is transmitted to the first service provider server through the first communication;
  - in a case where no temporary information is received from the first service provider server in response to transmission of the first authentication information through the second communication, transmitting the new authentication information to the first service provider server after the new authentication information is registered in the memory;
  - receiving second temporary information from the first service provider server in response to transmission of the new authentication information, wherein the second temporary information is used temporarily for receiving the first service from the first service provider server; and
  - transmitting the second temporary information to the second communication apparatus.

14. A mediation server comprising:
- a communication interface communicable with a first service provider server, a first communication apparatus, and a second communication apparatus different from the first communication apparatus;
- a processor; and
- a memory storing computer-readable instructions therein, the computer-readable instructions, when executed by the processor, causing the mediation server to perform:
  - acquiring, from the first service provider server, first authentication information for receiving a first service from the first service provider server;

registering association information and the first authentication information in the memory and correlating the association information with the first authentication information, the association information including group identification information identifying a group to which the first communication apparatus and the second communication apparatus join, in a case where a first request including the group identification information is received by the mediation server and from the first communication apparatus, performing first communication with the first communication apparatus and the first service provider server by transmitting to the first service provider server the first authentication information correlated with the group identification information in the memory, the first communication being for the first communication apparatus to receive the first service from the first service provider server; and in a case where a second request including the group identification information is received by the mediation server and from the second communication apparatus, performing second communication with the second communication apparatus and the first service provider server by transmitting to the first service provider server the first authentication information correlated with the group identification information in the memory, the second communication being for the second communication apparatus to receive the first service from the first service provider server.

15. The mediation server according to claim 14, wherein the computer-readable instructions, when executed by the processor, further cause the mediation server to perform generating the group identification information in a case where a group generation instruction is received from the first communication apparatus.

16. The mediation server according to claim 15, wherein the acquiring acquires the first authentication information which is received from the first communication apparatus in the case where the group generation instruction is received from the first communication apparatus, and wherein in the case where the group generation instruction is received from the first communication apparatus, the registering registers the first authentication information and the group identification information in the memory so as to be correlated with each other.

17. The mediation server according to claim 15, wherein the registering performs a joining process for allowing the second communication apparatus to join a group in a case where a group joining instruction is received from the second communication apparatus, and wherein the generating does not generate new group identification information in the case where the group joining instruction is received from the second communication apparatus.

18. The mediation server according to claim 17, wherein the joining process includes a process for transmitting the group identification information to the second communication apparatus so that the second communication apparatus can store the group identification information.

* * * * *